(No Model.)

W. W. CARMAN.
VAPORIZER FOR GREENHOUSES.

No. 305,145. Patented Sept. 16, 1884.

Witnesses.
S. N. Piper
E. B. Pratt

Inventor,
Wm. Wallace Carman.
by R. H. Eddy atty.

United States Patent Office.

WILLIAM WALLACE CARMAN, OF EXETER, NEW HAMPSHIRE.

VAPORIZER FOR GREENHOUSES.

SPECIFICATION forming part of Letters Patent No. 305,145, dated September 16, 1884.

Application filed November 1, 1883. (No model.)

*To all whom it may concern:*

Be it known that I, WILLIAM WALLACE CARMAN, of Exeter, in the county of Rockingham, of the State of New Hampshire, have invented a new and useful Improvement in Vaporizers for Greenhouses; and I do hereby declare the same to be described in the following specification and represented in the accompanying drawings, of which—

Figure 1:
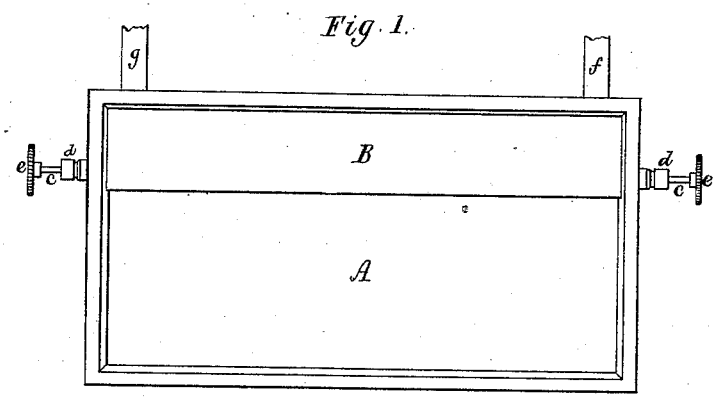
Figure 2:
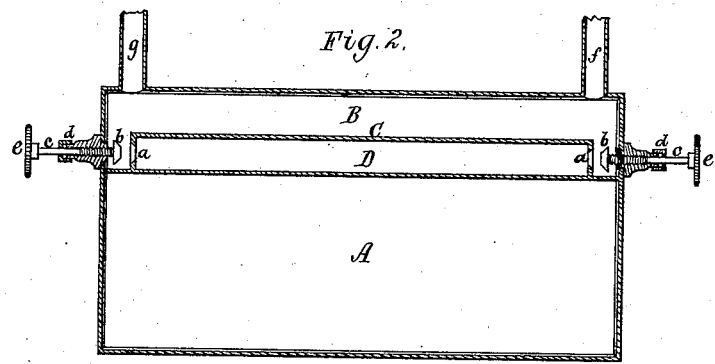
Figure 3:
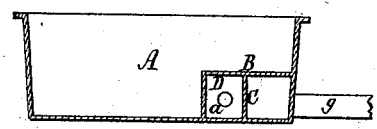

Figure 1 is a top view, Fig. 2 a horizontal section, and Fig. 3 a transverse section, of a vaporizer of my invention.

It is to effect the vaporization of water in a greenhouse, in order to prevent the air therein warmed by heat radiated from a radiator or steam-coil from becoming dry or deprived of moisture to the injury of the plants exposed to it.

In the drawings, A denotes a rectangular pan open at top, but having within it and extending from one end to the other of it, and against one side of it, a closed chamber, B, such chamber having a depth about half that of the pan. Within such chamber is a partition, C, which is arranged midway, or about so, between and parallel with the two opposite sides of the chamber. The said partition extends from top to bottom of the chamber, and near each end of the chamber turns at a right angle, and extends to the inner side of the chamber, as represented, and forms with the top and bottom of the chamber another or supplementary chamber, D. In each end of the said chamber D is an aperture, $a$, to operate with a plug or valve, $b$, whose stem $c$ screws through the end of the pan A, goes through a stuffing-box, $d$, and is provided with a milled head, $e$, as shown.

The chamber B has near one end of it an induct, $f$, and near the other end an educt, $g$, such being or to be connected with a steam-coil or direct steam-pipe, so as to cause steam therefrom to pass into, through, and out of the chamber B. In so passing through the said chamber when there may be water in the pan, the steam will heat the chamber so as to raise the temperature of such water and cause vapor to escape from it. By allowing steam to flow through the auxiliary chamber the temperature of the water may be raised still higher, the amount of such steam going through the chamber being regulated by the valve $b$. Thus by means of the auxiliary chamber and its end openings and valves arranged and combined with the main chamber and pan in the manner as shown and described, and applied, as set forth, to a steam-coil or direct steam-pipe, not only can the water of the pan be vaporized, but the extent of the vaporization of it can be regulated from time to time, as occasion or circumstances may require.

This apparatus in practice has been found to be very efficacious and useful for the purpose of vaporizing the air of a greenhouse.

I claim—

The vaporizer, substantially as described, consisting of the pan provided with the main and auxiliary chambers, their inducts and educts, and the two valves arranged with and adapted to it, essentially as set forth.

WILLIAM WALLACE CARMAN.

Witnesses:
W. F. PUTNAM,
H. W. HOWELL.